(12) United States Patent
Terahara

(10) Patent No.: US 6,535,309 B1
(45) Date of Patent: Mar. 18, 2003

(54) OPTICAL MULTIPLEXING/ DEMULTIPLEXING APPARATUS AND OPTICAL MULTIPLEXING/ DEMULTIPLEXING METHOD

(75) Inventor: Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/172,244

(22) Filed: Oct. 14, 1998

(30) Foreign Application Priority Data

Mar. 20, 1998 (JP) .......................................... 10-072435

(51) Int. Cl.⁷ .............................................. H04J 14/02
(52) U.S. Cl. ........................ 359/124; 359/177; 359/127
(58) Field of Search ................................ 359/124, 127, 359/187, 110, 130, 161, 177, 179

(56) References Cited

U.S. PATENT DOCUMENTS

| | | | | |
|---|---|---|---|---|
| 4,616,898 A | * | 10/1986 | Hicks, Jr. ..................... | 385/24 |
| 4,778,238 A | * | 10/1988 | Hicks .......................... | 359/134 |
| 5,959,749 A | * | 9/1999 | Danagher et al. ........... | 359/124 |
| 6,038,046 A | * | 3/2000 | Kaneko et al. .............. | 359/130 |
| 6,069,719 A | * | 5/2000 | Mizrahi ....................... | 359/124 |
| 6,078,413 A | * | 6/2000 | Yamaguchi .................. | 359/124 |
| 6,115,157 A | * | 9/2000 | Barnard et al. ............. | 359/124 |

FOREIGN PATENT DOCUMENTS

| | | |
|---|---|---|
| JP | 56-62435 | 5/1981 |
| JP | 63-312732 | 12/1988 |
| JP | 6-164515 | 6/1994 |

* cited by examiner

*Primary Examiner*—Leslie Pascal
(74) *Attorney, Agent, or Firm*—Staas & Halsey LLP (57) ABSTRACT

The present invention aims at providing optical multiplexing/demultiplexing apparatus and method, in which an optical power balance of each wavelength light of a wavelength division multiplexed signal light at input and output ports thereof can be maintained. Thus, an optical multiplexing/demultiplexing apparatus of the present invention has a basic constitution consisting of: an OADM circuit for branching a signal light of a specific wavelength from a wavelength-division-multiplexed signal light sent from a main optical fiber, and for inserting a signal light of a specific wavelength into the wavelength-division-multiplexed signal light sent from a main optical fiber; and an add-light power control portion for controlling the optical power of add light added in the OADM circuit based on a drop light branched in the OADM circuit. In the add-light power control portion, the optical power of each of drop light and add light is measured to perform a control operation of controlling the ratio between the optical power of the drop light and the optical power of the add light to be constant. Consequently, the optical power of signal light of each wavelength at input and output ports of the optical multiplexing/demultiplexing apparatus can be maintained at a constant level.

8 Claims, 12 Drawing Sheets

RELATED ART

FIG.13

OPTICAL MULTIPLEXING/ DEMULTIPLEXING APPARATUS AND OPTICAL MULTIPLEXING/ DEMULTIPLEXING METHOD

BACKGROUND OF THE INVENTION

1. Field of the Invention

The present invention relates to optical multiplexing/ demultiplexing apparatus and method therefor for use in an optical communication network to which wavelength division multiplexing (WDM) techniques are applied, and more particularly, to optical multiplexing/demultiplexing apparatus and method therefor, in which an optical power balance of each wavelength light of a wavelength division multiplexed signal light can be retained at input and output ports of the optical multiplexing/demultiplexing apparatus.

2. Description of the Related Art

A WDM system which utilizes band characteristics of optical fibers is a transmission system that is suitable for constructing an optical network which is flexible in taking in and out signal lights. Such an optical network permits not only the transmission of a wavelength division multiplexed signal from a point to a point but also the selective transmission of only signal light of a certain wavelength in a wavelength division multiplexed signal light and the branching or insertion of signal light of the other wavelengths by an optical multiplexing/demultiplexing apparatus provided at some midpoint on a transmission path.

Figure 10:
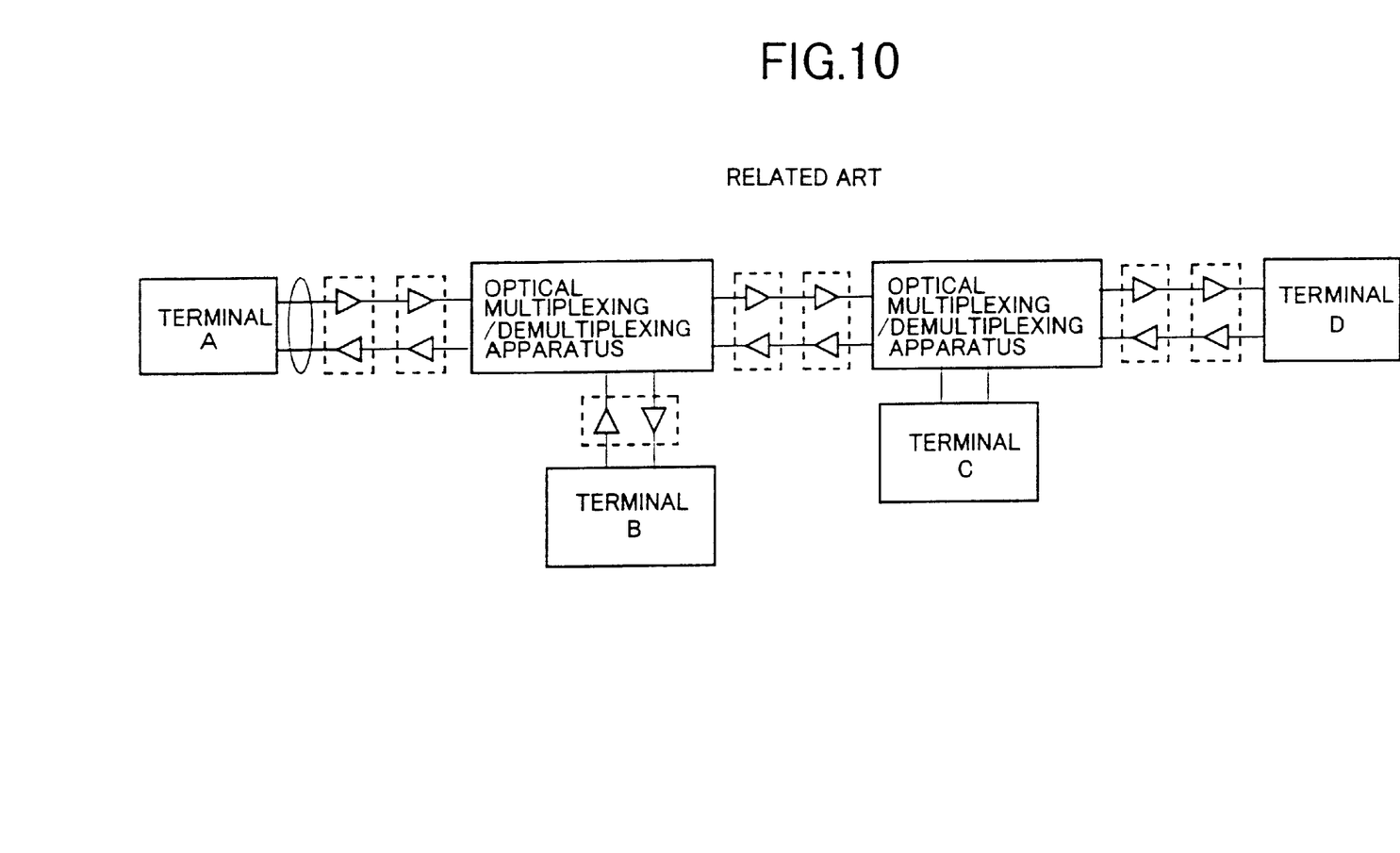
FIG. 10 is a diagram showing an example of a WDM network system employing a conventional optical multiplexing/demultiplexing apparatus.

FIG. 10 illustrates an example of an optical communication system (namely, a WDM network system), which is networked by using conventional optical multiplexing/ demultiplexing apparatuses.

In the conventional system of FIG. 10, at least a pair of optical fibers are used as transmission paths for upstream and downstream communication lines (or circuits). Further, a plurality of optical amplifier repeaters are placed for compensating losses in optical fibers. Each of the optical amplifier repeaters is provided with at least two optical amplifiers for the upstream and downstream communication lines. Moreover, a plurality of signal lights (namely, WDM signal lights) of different wavelengths are transmitted from each terminal device to a single optical fiber. Furthermore, the transmitted WDM signal lights are assigned transmission paths thereto according to the wavelength thereof, respectively, by the optical multiplexing/demultiplexing apparatuses, then, sent to a receiving terminal device.

Figure 11:
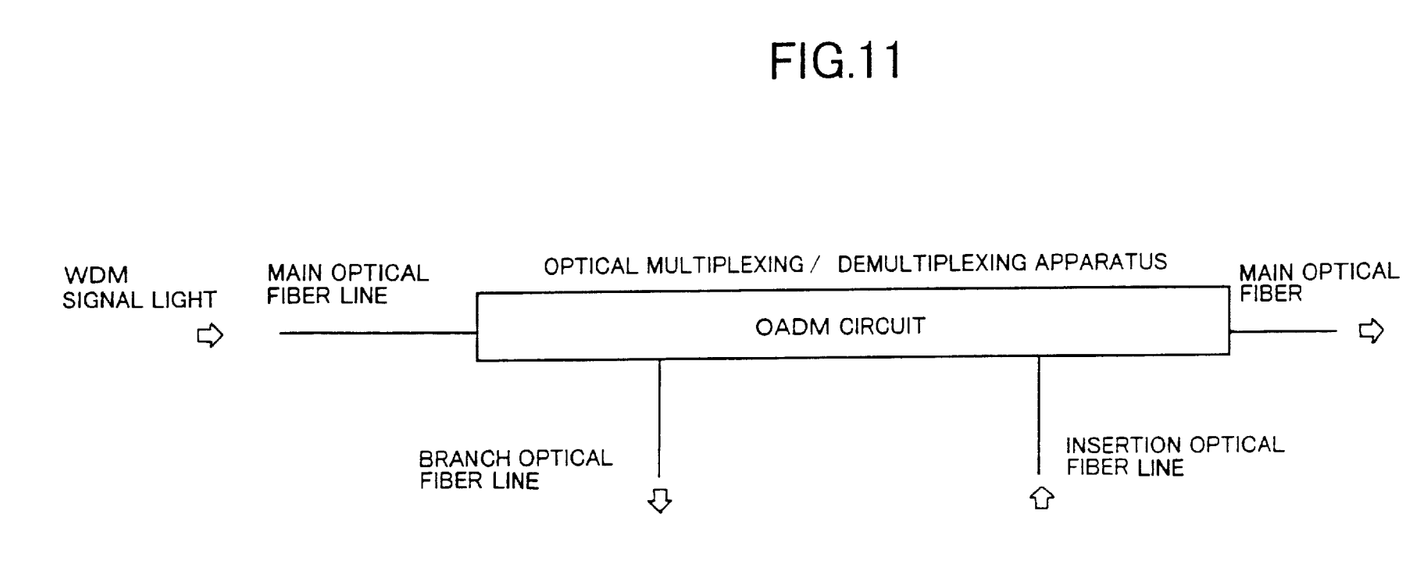
FIG. 11 is a diagram illustrating a basic operation of a conventional OADM circuit.

The conventional optical multiplexing/demultiplexing apparatuses used in such a WDM network system are constituted by combining optical add-drop multiplexer (OADM) circuits as illustrated in FIG. 11.

In the OADM circuit of FIG. 11, among WDM signal lights propagating in a main optical fiber, signal lights of some wavelengths are branched to branch optical fibers. Further, signal lights of the remaining wavelengths are multiplexed with a signal light input from an insertion optical fiber, then to be output to the main optical fiber. This OADM circuit can be constituted by using wavelength multiplexing/demultiplexing elements, for instance, a dielectric multilayer filter, a WDM coupler, a fiber grating and an arrayed waveguide grating (AWG). Hitherto, there have been proposed ADM circuits of various constitutions (see, for example, Miyakawa et al., "A Study of Optical ADM using Dielectric Filter", Denshi Joho Tsushin Gakkai Sogo Taikai, vol. B-10-234, 1997; "Optical ADM and Wavelength Routing Based on WDM System", by the applicant of the instant application, Denshi Joho Tsushin Gakkai Sogo Taikai, vol. B-1158, 1996; and Mizuochi et al., "A Study on Optical Add-Drop Multiplexers Using Fiber Grating Filters", Denshi Joho Tsushin Gakkai Tsushin Society Taikai, vol. SB-9-5, 1995).

Figure 12:
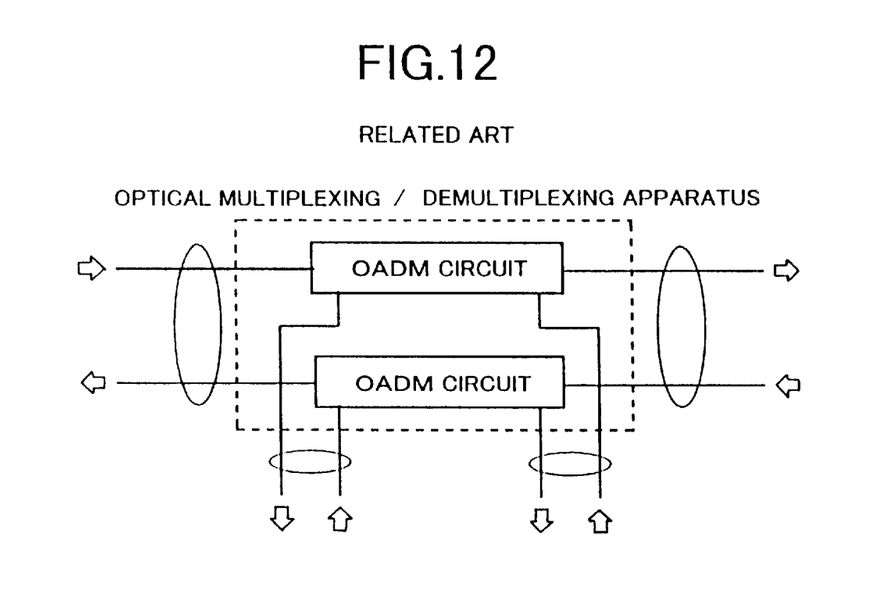
FIG. 12 is a diagram showing an example of a conventional optical multiplexing/demultiplexing apparatus constituted by employing two OADM circuits.

In an actual WDM network system, there is the necessity for using at least one optical fiber pair paths for the upstream and downstream lines. Therefore, the optical multiplexing/ demultiplexing apparatus is constituted by at least two OADM circuits as illustrated in FIG. 11. FIG. 12 shows an example of the conventional optical multiplexing/ demultiplexing apparatus constituted by two OADM circuits.

The aforementioned conventional optical multiplexing/ demultiplexing apparatus, however, has encountered the problem that there is caused a difference in optical power level between signal light (hereunder sometimes referred to as through light) passing through the OADM circuit and signal light (hereunder sometimes referred to as add light) inserted in the OADM circuit.

Figure 13:
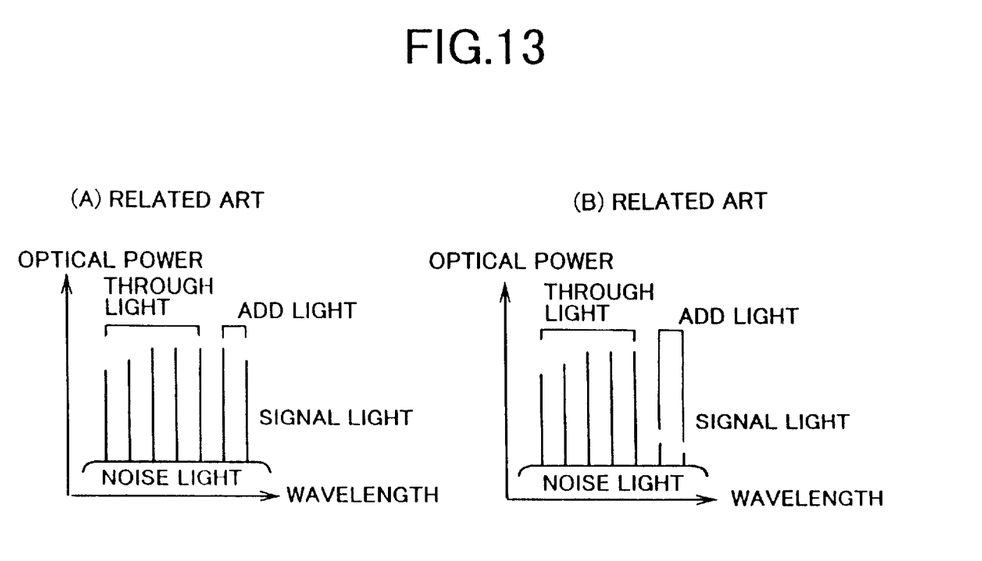
FIGS. 13(A) and 13(B) are graphs illustrating an example of the spectra of WDM signal light passing through the conventional multiplexing/demultiplexing apparatus.

In the case that the optical power level is balanced between through light and add light included in signal light passing through the OADM circuit as shown in FIG. 13(A), the WDM signal light is normally transmitted between the terminal devices. However, the balance between the optical power levels of the through light and the add light included in the signal light passing through the OADM circuit is lost when the power of the WDM signal light or the add light input to the OADM circuit decreases owing to an increase in loss in the optical fiber provided in a pre-stage of the optical multiplexing/demultiplexing apparatus or to lowering of an output of the optical amplifier repeater. For instance, in the case where the power level of the add light is extremely smaller than that of the through light as illustrated in FIG. 13(B), the add light is buried in noises caused by the optical amplifier repeater at a repeater section provided in a post-stage of the optical multiplexing/demultiplexing apparatus. Consequently, the transmission characteristics are extremely deteriorated.

As a system for reducing the difference in optical power level between through light and add light, there have been proposed systems for regulating the optical power of add light transmitted from a terminal device to an optical multiplexing/demultiplexing apparatus, by controlling an operation of an optical amplifier repeater placed between the terminal device, which transmits add light, and the optical multiplexing/demultiplexing apparatus. Practically, an example of such systems is such that an amplifying operation of an optical amplifier repeater is controlled by transmitting a supervisory control signal from a terminal device to an optical multiplexing/demultiplexing apparatus. Alternatively, another example of such systems is that a dummy light of different wavelengths is transmitted from the terminal device in addition to add light, and the optical power level of the add light output from the optical amplifier repeater is controlled by regulating a power level of the dummy light. These systems, however, have encountered the problems that the systems cannot preserve the balance between the optical power levels of the through light and the add light in the case that an abnormality, such as, increase in loss of optical fiber, occurs between a terminal device and an optical amplifier repeater or between an optical amplifier repeater and an optical multiplexing/demultiplexing apparatus, and that there is a limit to the range of the optical power of add light, which can be controlled by an optical amplifier repeater.

SUMMARY OF THE INVENTION

The present invention is accomplished in view of the aforementioned problems. Accordingly, an object of the present invention is to provide optical multiplexing/demultiplexing apparatus and method therefor in which an optical power of each wavelength signal light of a wavelength division multiplexed signal light can be retained at input and output ports by controlling a power level of an insertion light in the optical multiplexing/demultiplexing apparatus.

To achieve the foregoing object and in accordance with an aspect of the present invention, there is provided an optical multiplexing/demultiplexing apparatus comprising a branching/inserting device connected to a transmission path where a wavelength division multiplexed signal light is transmitted, and being capable of branching a signal light of at least one wavelength from a signal light transmitted on the transmission path, and being capable of inserting a signal light of at least one wavelength into a signal light transmitted on the transmission path, wherein the optical multiplexing/demultiplexing apparatus further comprises an insertion-light power control device for controlling an optical power of an insertion light based on an optical power of a branch light branched by the branching/inserting device, so that a ratio between the optical power of the branch light branched by the branching/inserting device, and the optical power of the insertion light inserted by the branching/inserting device is constant.

With such a constitution, the optical power of the insertion light is controlled by the insertion-light power control device based on the optical power of the branch light branched by the aforesaid branching/inserting device, so that a ratio between the optical power of the transmission light and the optical power of the branch light at an input port of the branching/inserting device is equal to a ratio between the optical power of the transmission light and the optical power of the insertion light at an output port of the branching/inserting device. Consequently, an optical power of each wavelength light of a wavelength division multiplexed signal light at each of input and output ports of the optical multiplexing/demultiplexing apparatus can be maintained at a constant level. Therefore, good transmission quality of wavelength division multiplexed signal light can be maintained.

Further, a practical embodiment of the abovedescribed optical multiplexing/demultiplexing apparatus may be constituted so that the branching/inserting device comprises: a signal light branching portion for sending a signal light of at least one wavelength included in a wavelength division multiplexed signal light travelling on the transmission path, to the insertion-light power control device as a branch light and for outputting a signal light of the other wavelengths as a transmission light; and a signal light inserting portion for multiplexing the transmission light from the signal light branching portion with the insertion light sent from the insertion-light power control device, to output a multiplexed light to the transmission path, and the insertion-light power control device comprises: a branch light power detecting portion for detecting the optical power of the branch light from the signal light branching portion; an insertion-light power detecting portion for detecting the optical power of the insertion light input from the exterior; an insertion-light power regulating portion for regulating the optical power of the insertion light; and a control portion for controlling an operation of the insertion-light power regulating portion, based on the optical power of the branch light detected by the branch light power detecting portion and on the optical power of the insertion light detected by the insertion-light power detecting portion.

Further, another practical embodiment of the optical multiplexing/demultiplexing apparatus may be constituted so that a plurality of the aforesaid branching/inserting devices are provided corresponding to a plurality of main transmission paths, respectively, and a plurality of the insertion-light power control devices are provided corresponding to the plurality of main transmission paths, respectively. Thus, for each of the main transmission paths, the relative optical power of each wavelength light of the wavelength division multiplexed signal light at the input and output ports of the optical multiplexing/demultiplexing apparatus can be maintained at a constant level.

Moreover, the aforesaid optical multiplexing/demultiplexing apparatus may further comprises: a branch light power control device for controlling the optical power of each of branch lights respectively having wavelengths different from one another branched by the branching/inserting device; a branch light multiplexing device for multiplexing branch lights output from the branch light power control device and for outputting the multiplexed light to one of a pair of branch transmission paths; and an insertion light demultiplexing device for demultiplexing a signal light which is obtained by multiplexing each insertion light inserted by the branching/inserting device and is sent from the other of the pair of branch transmission paths corresponding to wavelengths thereof and for outputting the demultiplexed light to the insertion-light power control device, so that the optical power of each branch light included in output signal light of the branch light multiplexing device is controlled to be constant.

With such a constitution, the branch light sent from each of the branching/inserting device is multiplexed at a constant power. Then, the multiplexed branch light is output to the branch transmission path. Moreover, the multiplexed insertion light inserted from the branch transmission path is demultiplexed for each wavelength, and then sent to the insertion-light power control device.

Accordingly, it is possible to cope with a pair of branch transmission paths, such as an optical fiber pair paths. Further, the relative optical power of each branch light is controlled to be constant. Thus, the optical power balance among respective wavelength signal lights of the wavelength division multiplexed signal light propagating the branch transmission paths can be retained constant.

Furthermore, as a practical constitution of the branch light power control device may comprise: an optical power detecting portion for detecting the optical power of each of the branch lights branched by the branching/inserting device; an optical power regulating portion for regulating the optical power of each of the branch lights; and an optical power control portion for controlling an operation of the optical power regulating portion based on the optical power of each of the branch lights detected by the aforesaid optical power detecting portion.

In addition, the constitution may be such that an operation of the optical power regulating portion is controlled by the optical power control portion based on the optical power of each of the branch lights detected by the optical power detecting portion of each insertion-light control device. Thus, the branch light power detecting portion of the insertion-light control device can be used in common as the optical power detecting portion of the branch light power control device. Consequently, the constitution of the branch light power control device is simplified.

Furthermore, in accordance with another aspect of the present invention, there is provided an optical multiplexing/demultiplexing method for enabling the branching of a signal light of at least one wavelength from a signal light travelling on a transmission path where a wavelength division multiplexed signal light is transmitted, and inserting of a signal light of at least one wavelength into a signal light travelling on the transmission path, wherein an optical power of an insertion light inserted into a signal light travelling on the transmission path is controlled based on an optical power of a branch light branched from the signal light travelling on the transmission path so that a ratio between the optical power of the branch light and the optical power of the insertion light is constant.

Other features, objects and advantages of the present invention will become apparent from the following description of preferred embodiments with reference to the accompanying.

DETAILED DESCRIPTION OF THE PREFERRED EMBODIMENTS

Hereinafter, preferred embodiments of the present invention will be described in detail by referring to the accompanying drawings.

Figure 1:
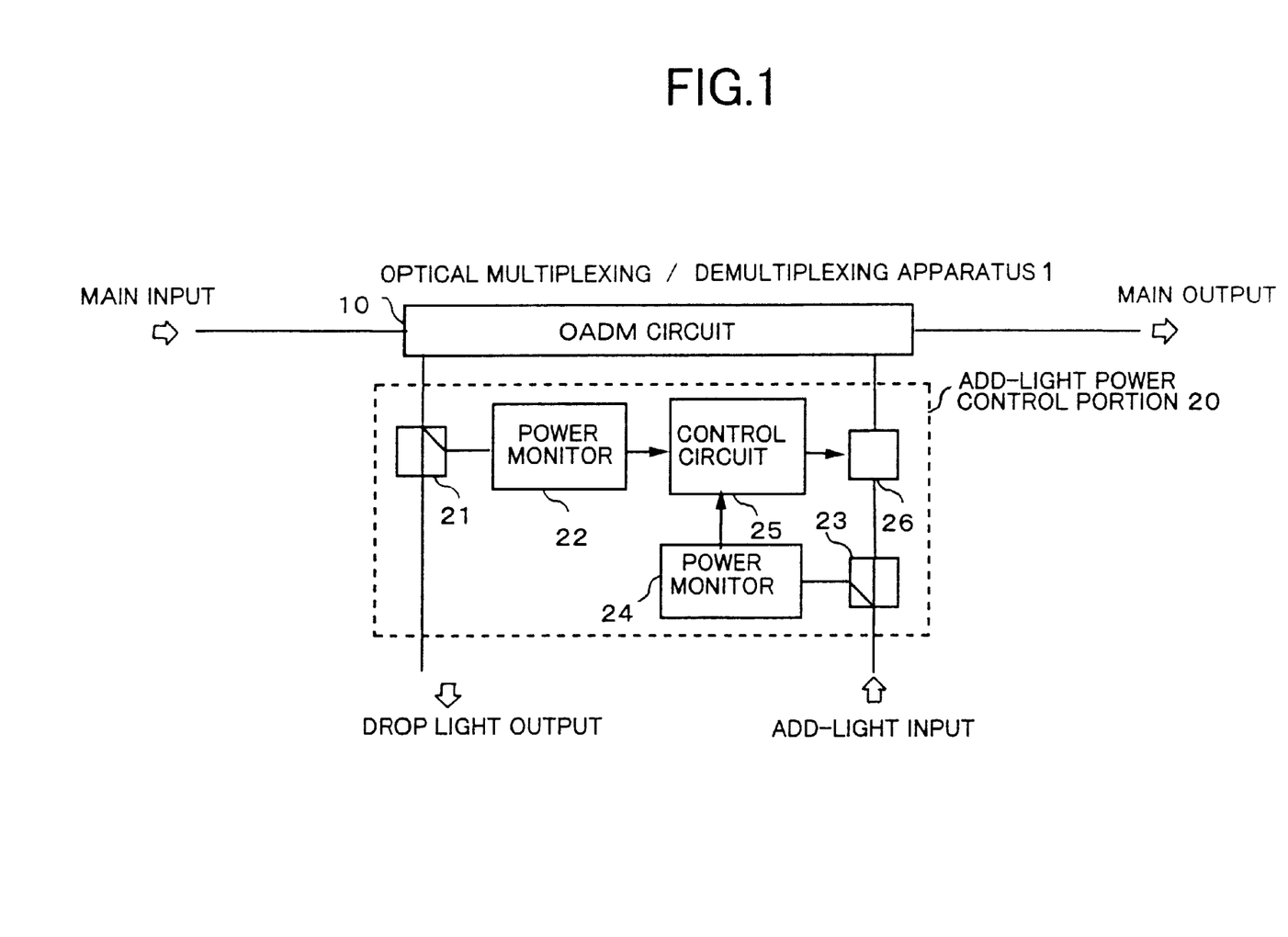
FIG. 1 is a block diagram showing a basic constitution of an optical multiplexing/demultiplexing apparatus according to an embodiment of the present invention.

FIG. 1 is a block diagram showing a basic constitution of an optical multiplexing/demultiplexing apparatus according to an embodiment of the present invention.

As shown in FIG. 1, this optical multiplexing/demultiplexing apparatus 1 has a basic constitution consists of: an OADM circuit 10 serving as branching/inserting device for receiving a WDM signal light from a main optical fiber and for performing the branching of the WDM signal light into signal light of a specific wavelength and the insertion of signal light of a specific wavelength into the WDM signal light; and an add-light power control portion 20 acting as insertion-light power control device for controlling an optical power of signal light (namely, add light) to be inserted by the aforesaid OADM circuit 10.

Figure 2:
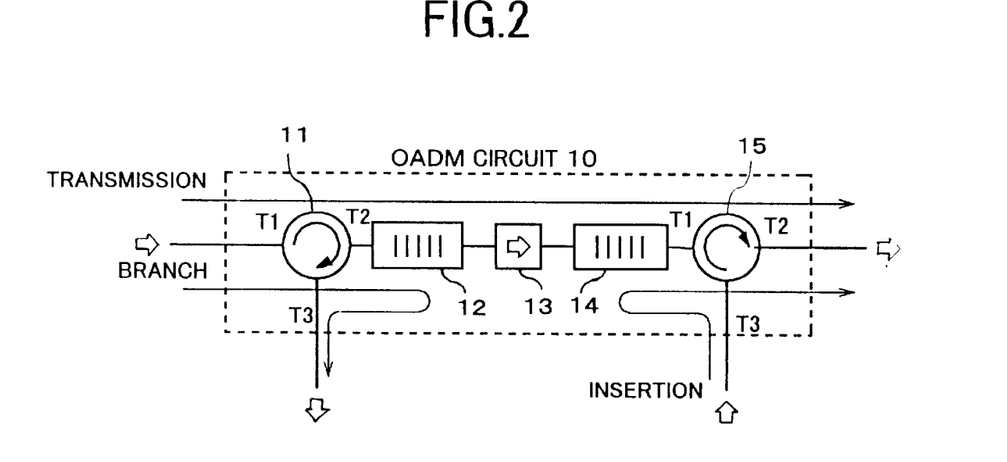
FIG. 2 is a diagram showing a constitution example of an OADM circuit of the embodiment of FIG. 1.

The OADM circuit 10 is similar to the OADM circuit used in the conventional optical multiplexing/demultiplexing apparatus. FIG. 2 shows the constitution of an example of the OADM circuit, which is constituted by using fiber gratings, as an ordinary OADM circuit.

In the OADM circuit 10, an optical circulator 11 is connected to an input side of the main optical fiber. This optical circulator 11 has three terminals T1, T2 and T3. The main optical fiber is connected to the terminal T1 of the optical circulator 11. A signal light is transmitted only in one direction between each pair of the terminals. In the case of this embodiment, it is assumed that a signal light is transmitted only in a direction from the terminal T1 to the terminal T2, a direction from the terminal T2 to the terminal T3 and a direction from the terminal T3 to the terminal T1. One end of a fiber grating 12 is connected to the terminal T2 of the optical circulator 11. This fiber grating 12 has characteristics to reflect only a light of a specific wavelength and transmit a light of the other wavelengths. One end of a fiber grating 14 is connected to the other end of the fiber grating 12 through an photoisolator 13. This photoisolator 13 transmits a signal light only in the direction from the fiber grating 12 to the fiber grating 14, and thus prevents an occurrence of multi-reflection between the fiber gratings 12 and 14. Further, it is assumed that the fiber grating 14 has characteristics similar to those of the fiber grating 12. An optical circulator 15 is connected to the other end of the fiber grating 14. This optical circulator 15 has three terminals T1 to T3, similarly as the optical circulator 11 does. A terminal T1 of the optical circulator 15 is connected to the other end of the fiber grating 14. Further, a terminal T2 of the optical circulator 15 is connected to an output side of the main optical fiber. The characteristics in transmitting signal light between the terminals of the optical circulator 15 are similar to those of the optical circulator 11.

In such an OADM circuit 10, a signal light of a specific wavelength in WDM signal light input from the main optical fiber is reflected by the fiber grating 12 and passes through a path shown in this figure and is then branched to the terminal T3 of the optical circulator 11. On the other hand, WDM light of the other wavelengths transmitted by the fiber grating 12 is output to the main optical fiber by being multiplexed with a signal light of a specific wavelength input from the terminal T3 of the optical circulator 15. Thus, in the case of this embodiment, the optical circulator 11 and the fiber grating 12 function as a signal light branching portion. Further, the fiber grating 14 and the optical circulator 15 function as a signal light inserting portion.

Incidentally, mostly, the wavelength of branch light branched by the OADM circuit 1 is selected in such a manner as to be the same as of insertion light to be inserted by the OADM circuit 1. However, the wavelength of the branch light is not limited to the same wavelength as that of the insertion light. Moreover, the constitution of the OADM circuit 1 is not limited to the constitution using the aforementioned fiber gratings. For example, the OADM circuit 1 may be constituted by using wavelength multiplexing/demultiplexing elements, such as dielectric multilayer filters, WDM couplers, or arrayed waveguide gratings (AWGs).

The add-light power control portion 20 is provided with: an optical branching circuit 21 for branching a part of signal light (namely, drop light) output from the terminal T3 of the optical circulator 11 of the OADM circuit 10; and a power monitor 22 serving as a branch light power detecting portion for measuring an optical power of the branched drop light. The add-light power control portion 20 is further provided with: a branching circuit 23 for branching a part of add light sent from the branch optical fiber; and a power monitor 24 serving as an insertion light power detecting portion for measuring an optical power of the branched add light. The add-light power control portion 20 is further provided with: a control circuit 25 serving as a control portion for generating a control signal based on a monitoring signal output from each of the power monitors 22 and 24; and an optical power regulating portion 26 acting as an insertion light power regulating portion for controlling the optical power of add light according to or in response to the control signal.

Further, for example, the fused type optical couplter or bulk type optical components may be used as the optical branching circuits 21 and 23. Moreover, it is assumed that the power monitors 22 and 24 are supplied with an electric signal (namely, a monitoring signal) proportional to an average optical power by performing the photoelectric conversion of signal light by means of a photodiode. An optical variable attenuator capable of changing the loss amount or gain according to a control signal from the control circuit 25, or an optical amplifier may be used as the optical power regulating portion 26. Practically, for instance, an optical variable attenuator, to which a magneto-optic effect is applied, may be used as the optical power regulating portion 26. This optical variable attenuator can changes the attenuation quantity (or loss amount) thereof by the use of electric device. Furthermore, the optical output power thereof can be controlled according to a control signal sent from the control circuit 25.

Incidentally, although the constitution of the apparatus, in which the optical branching circuit 23 is placed at the input side of the optical power regulating portion 26, has been described herein-above, the optical branching circuit 23 may be placed at the output side of the optical power regulating portion 26.

In the optical multiplexing/demultiplexing apparatus 1 with such a constitution, the optical power of add light is automatically controlled by the add-light power control portion 20 so that a ratio between the optical power of through light and the optical power of drop light at a main input port (namely, at the terminal T1 of the optical circulator 11) is equal to a ratio between the optical power of through light and the optical power of add light at a main output port (namely, at the terminal T2 of the optical circulator 15).

Figure 3:
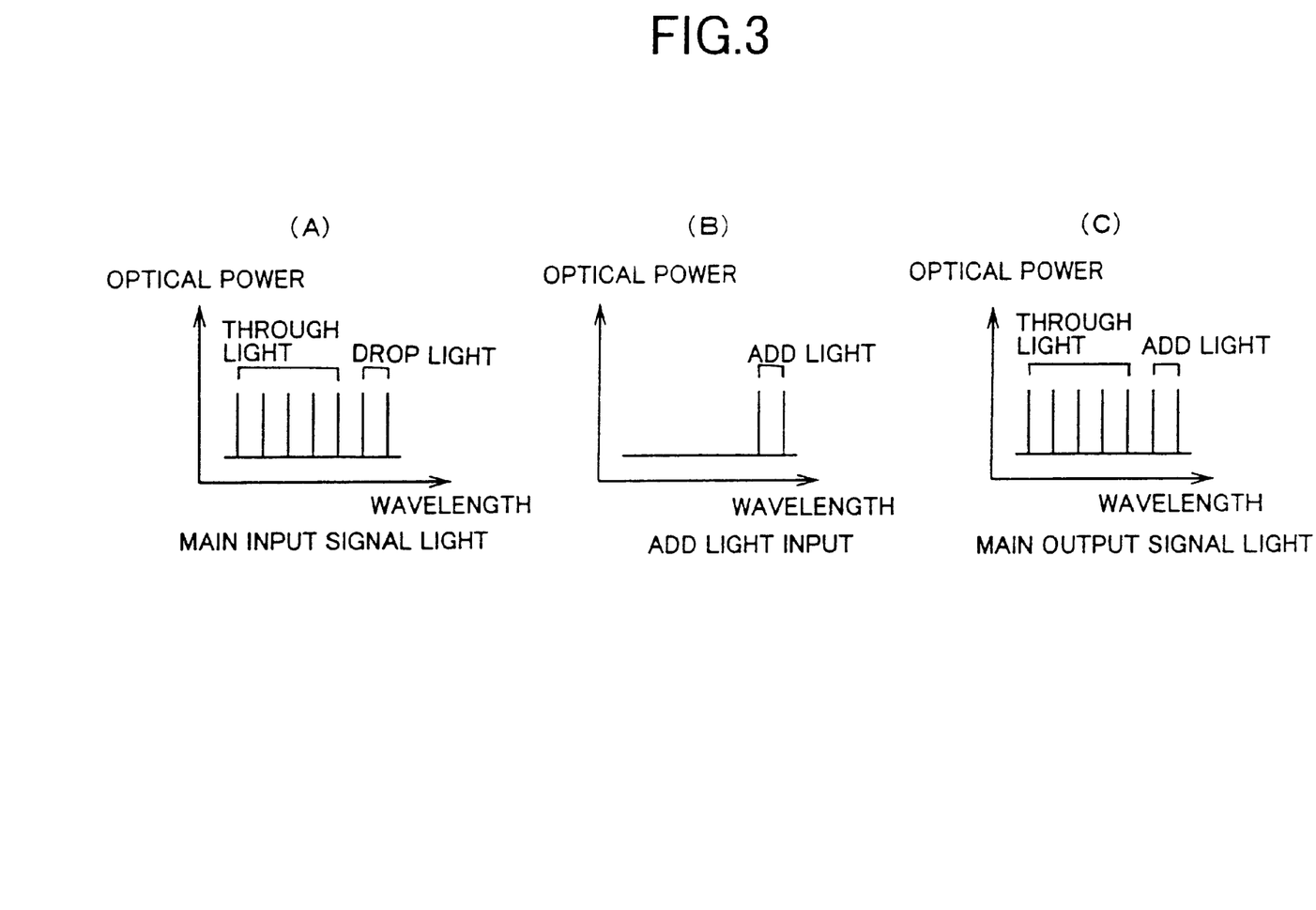
FIGS. 3(A), 3(B) and 3(C) are graphs showing spectra of input signal light and output signal light of the embodiment of FIG. 1.

This operation will be concretely described hereinbelow. As shown in a conceptual spectrum graph of FIG. 3(A), the WDM signal light is input to the OADM circuit 10 from the main input port and is then demultiplexed corresponding to wavelengths. Subsequently, through light is led to the main output port, and drop light is introduced to a drop-light output port (namely, the terminal T3 of the optical circulator 11). Furthermore, add light as illustrated in FIG. 3(B) is input from an add-light input port (namely, the terminal T3 of the optical circulator 15) of the OADM circuit 10, and is then multiplexed with the aforementioned through light. Subsequently, the WDM signal light as illustrated in FIG. 3(C) is output from the main output port.

In the add-light power control portion 20, a part of drop light output from the OADM circuit 10 is branched by the optical branching circuit 21. Then, the optical power of the branched drop light is measured by the power monitor 22. Further, a part of add light sent from the branch optical fiber is branched by the optical branching circuit 23. Then, the optical power of the branched add light is measured by the power monitor 24. Further, the control circuit 25 compares the monitoring signals, which are respectively output from the power monitors 22 and 24, with each other, and then a control signal is sent to the optical power regulating portion 26. Thus, the optical power of the add light having passed through the optical branching circuit 23 is controlled.

Incidentally, if Pt,in denote the optical power of through light input from the main input port, Pd,in denote the optical power of drop light input from the main input port, Pt,out designate the optical power of through light output from the main output port, and Pa,out designate the optical power of add light output from the main output port, the condition, where the ratio between the optical power of through light and the optical power of drop light at the main input port is equal to the ratio between the optical power of through light and the optical power of add light at the main output port, means that the relation represented by the following equation (1) holds:

$$Pd,in/Pt,in=Pa,out/Pt,out \qquad (1)$$

Additionally, regarding the design parameters of the optical multiplexing/demultiplexing apparatus 1, if Pa,in denote the optical power of add light input to the add-light power control portion 20, Lt denote the (fixed) loss occurring between the main input port and the main output port of the OADM circuit 10, Ld denotes the (fixed) loss occurring between the main input port and the power monitor 22 of the add-light power control portion 20, and X denotes the (regulatable) loss occurring between the add-light input port of the add-light power control portion 20 and the main output port of the OADM circuit 10, in the add-light power control portion 20, the optical power of the add light is controlled so that the following equation (2) holds:

$$X=Lt \cdot Pd,in/Pa,in \qquad (2)$$

The ratio between the optical power of the through light and the optical power of the add light at the main output port is represented as follows by using the equation (2):

$$\begin{aligned} Pa, out/Pt, out &= (X \cdot Pa, in)/(Lt \cdot Pt, in) \qquad (3) \\ &= (Lt \cdot Pd, in/Pa, in \cdot Pa, in)/(Lt \cdot Pt, in) \\ &= Pd, in/Pt, in \end{aligned}$$

Thus, the equation (1) is equivalent to the equation (3). Namely, the ratio between the optical power of through light and the optical power of drop light at the input port and the ratio between the optical power of through light and the optical power of add light at the output port can be maintained at constant levels, respectively, by operating the add-light power control portion 20 so that the equation (2) holds.

Hereinafter, practical examples of the optical multiplexing/demultiplexing apparatus having the aforementioned basic constitution will be described.

Figure 4:
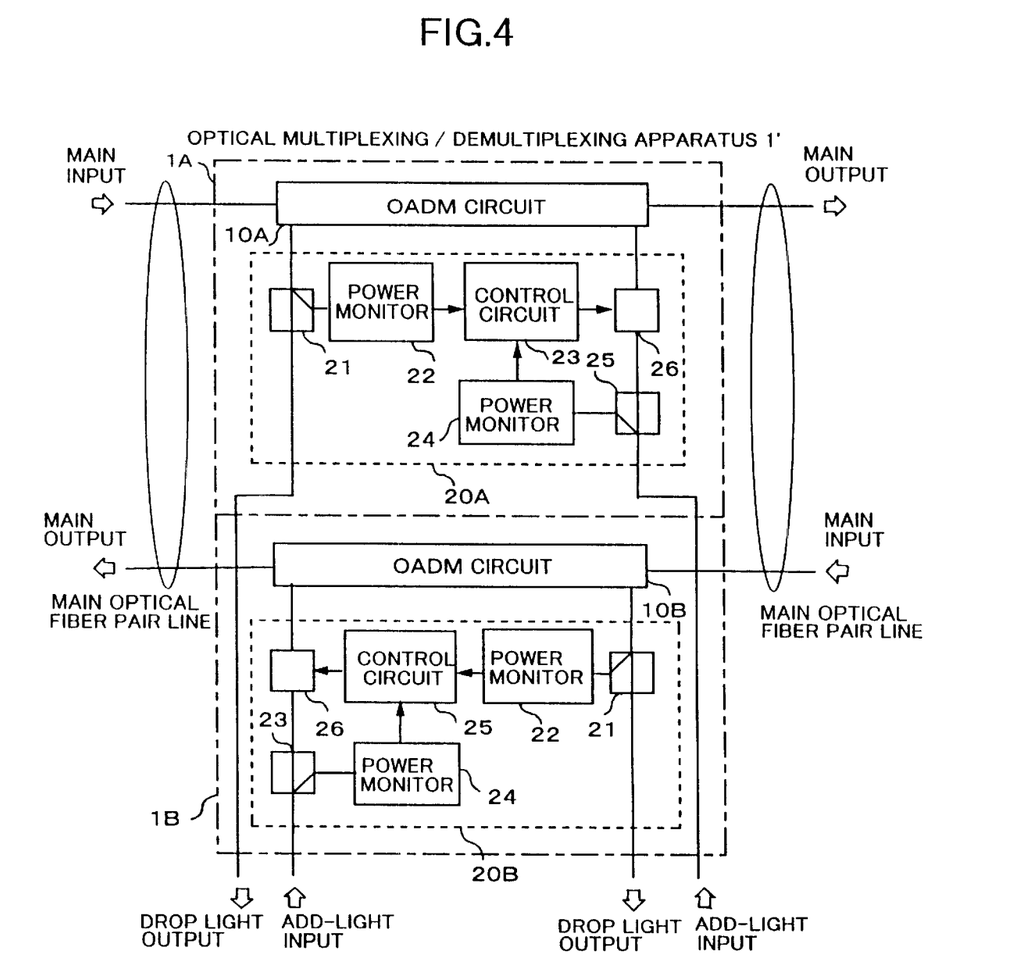
FIG. 4 is a block diagram illustrating an example of an optical multiplexing/demultiplexing apparatus constituted by combining the structures of the basic constitution of FIG. 1.

FIG. 4 is a block diagram illustrating an example of an optical multiplexing/demultiplexing apparatus constituted by combining two basic structures of FIG. 1.

As shown in FIG. 4, this optical multiplexing/demultiplexing apparatus 1' consists of: an optical multiplexing/demultiplexing portion 1A corresponding to an upstream main line; and an optical multiplexing/demultiplexing portion 1B corresponding to a downstream main line. Each of the optical multiplexing/demultiplexing portions 1A and 1B has a corresponding one of OADM circuits 10A and 10B and a corresponding one of add-light power control portions 20A and 20B. Each of the OADM circuits 10A and 10B has a constitution similar to that of the aforementioned OADM circuit 10. Further, each of the add-light power control portions 20A and 20B has a constitution similar to that of the aforementioned add-light power control portion 20.

In this apparatus, a main input port of the optical multiplexing/demultiplexing portion 1A and a main output port of the optical multiplexing/demultiplexing portion 1B are connected to the main optical fiber pair paths shown at the left-hand side, as viewed in this figure. Further, a main output port of the optical multiplexing/demultiplexing portion 1A and a main input port of the optical multiplexing/demultiplexing portion 1B are connected to the main optical fiber pair paths shown at the right-hand side, as viewed in this figure. Moreover, each drop light beams branched by the optical multiplexing/demultiplexing portions 1A and 1B are output to the two branch optical fibers, respectively. Each of add light beams sent from the other two branch optical fibers is input to a corresponding one of the optical multiplexing/demultiplexing portions 1A and 1B.

Figure 5:
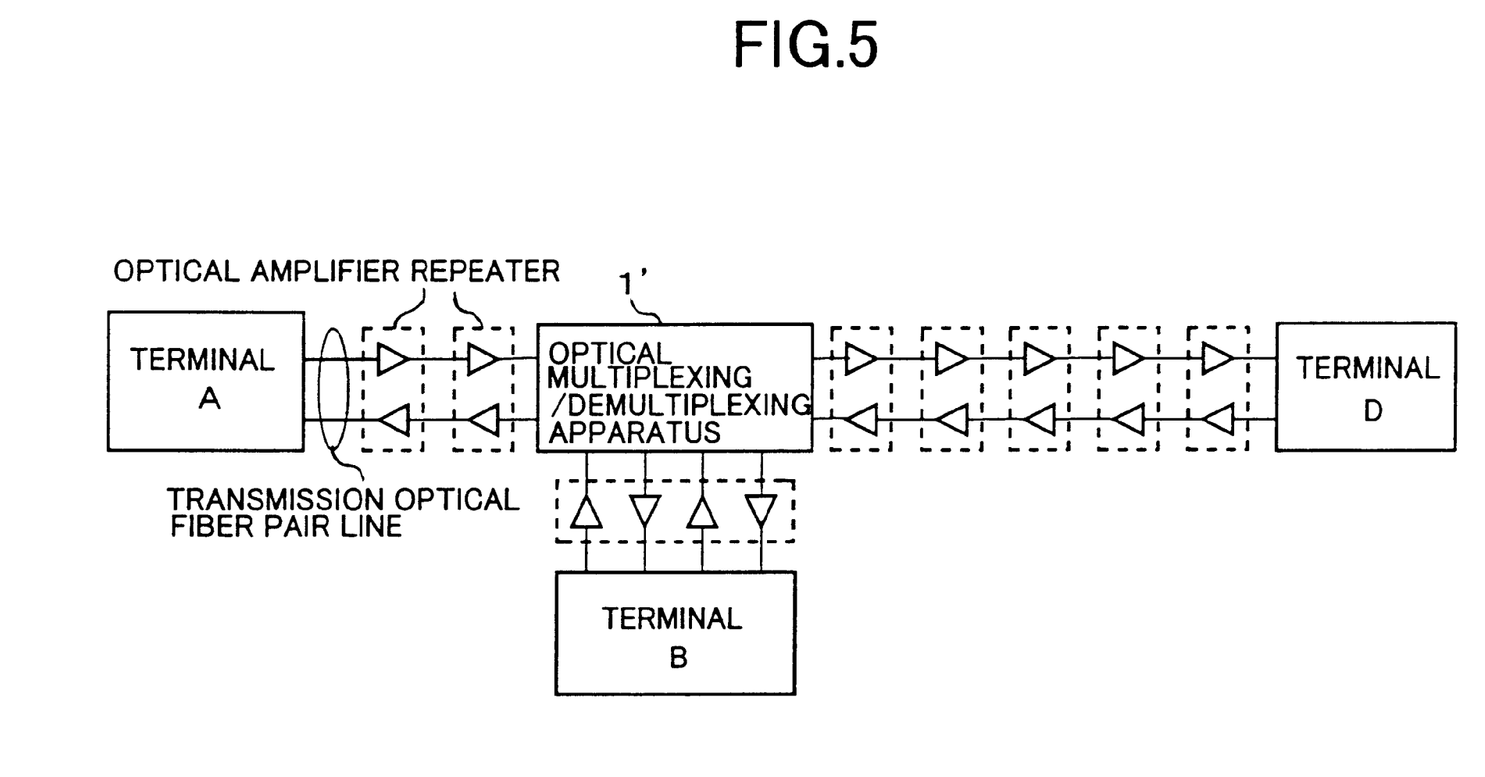
FIG. 5 is a diagram showing a constitution of a WDM network system to which the optical multiplexing/demultiplexing apparatus of FIG. 4 is applied.

Such an optical multiplexing/demultiplexing apparatus 1' is used in the WDM network system as illustrated in FIG. 5. Thus, the relative optical power balance among respective wavelengths (channels) of the WDM signal light can be maintained at a constant level at input and output ports of the optical multiplexing/demultiplexing apparatus 1' in both of the upstream and downstream of the main path.

Next, a modification of the optical multiplexing/demultiplexing apparatus 1' of FIG. 4, which is obtained by replacing the branch optical fibers with a single optical fiber pair paths thereof, will be described hereunder.

Figure 6:
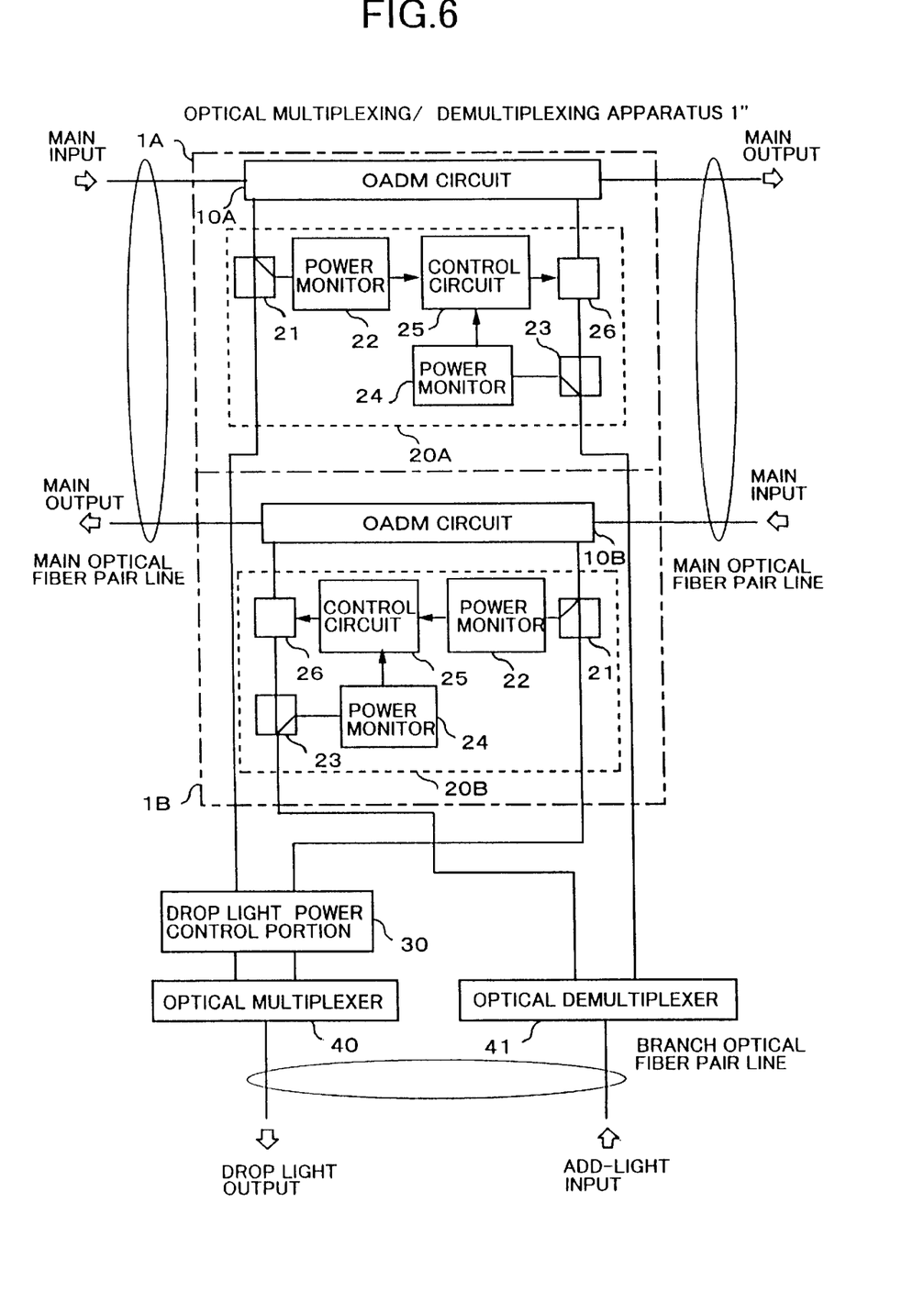
FIG. 6 is a block diagram showing a constitution of an example of an optical multiplexing/demultiplexing apparatus obtained by adapting the apparatus of FIG. 4 in such a manner as to be able to utilize one branch optical-fiber pair paths.

FIG. 6 is a diagram showing a constitutional example of an optical multiplexing/demultiplexing apparatus obtained by adapting the apparatus in such a manner as to be able to utilize one branch optical-fiber pair paths.

As is seen from FIG. 6, the constitution of this optical multiplexing/demultiplexing apparatus 1" is different from the constitution of the optical multiplexing/demultiplexing apparatus 1' of FIG. 4 in that the apparatus 1" is provided with: a drop-light power control portion 30 serving as a branch light power control device to which respective drop lights branched by the optical multiplexing/demultiplexing portions 1A and 1B, respectively, are input; an optical multiplexer 40 serving as a branch light multiplexing device for multiplexing respective drop lights output from the drop-light power control portion 30 and for outputting the multiplexed signal light to one of the branch optical fiber pair paths; and an optical demultiplexer 41 acting as an insertion-light demultiplexing device for demultiplexing two wavelength-multiplexed add lights sent from the other of the branch optical fiber pair paths, and for transmitting the demultiplexed signal lights to each of the optical multiplexing/demultiplexing portions 1A and 1B. The remaining part of the constitution of the apparatus 1" is similar to the corresponding part of the constitution of the apparatus 1'.

Figure 7:
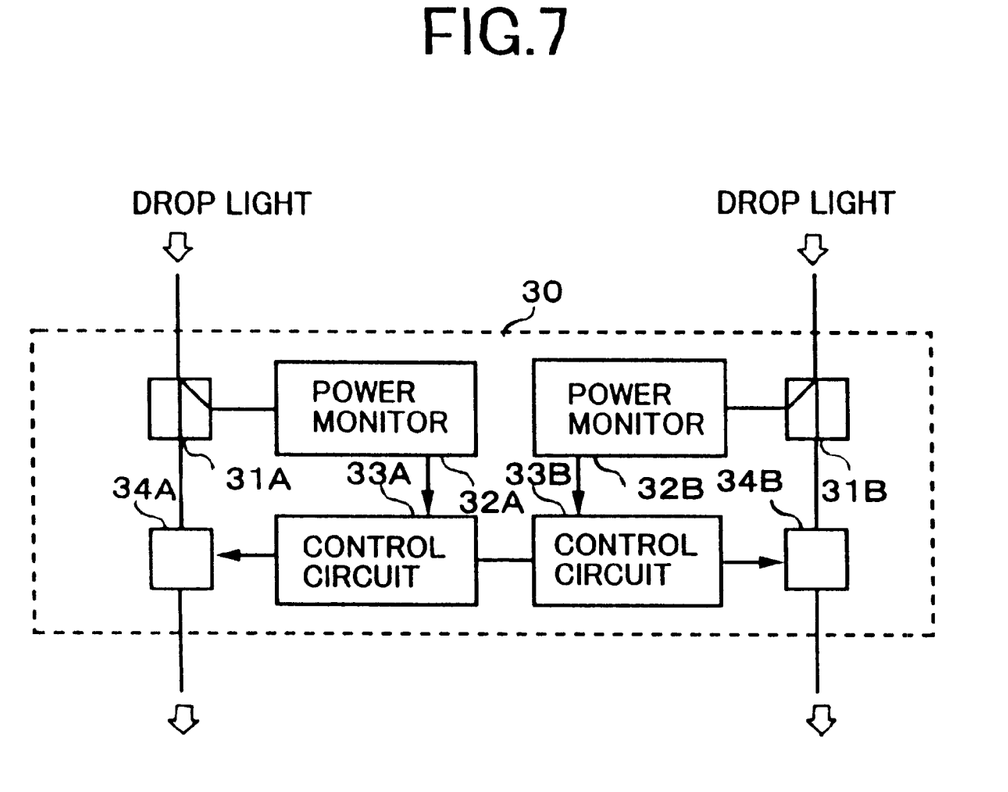
FIG. 7 is a block diagram showing a constitution example of a drop-light power control portion used in the optical multiplexing/demultiplexing apparatus of FIG. 6.

The drop-light power control portion 30 is provided with: for instance, an optical branching circuit 31A for branching a part of drop light sent from the optical multiplexing/demultiplexing portion 1A; and a power monitor 32A for measuring the optical power of the drop light branched by the optical branching circuit 31A, as illustrated in FIG. 7. The drop-light power control portion 30 is further provided with: an optical branching circuit 31B for branching a part of drop light sent from the optical multiplexing/demultiplexing portion 1B; and a power monitor 32B for measuring the optical power of the drop light branched by the optical branching circuit 31B. Moreover, the drop-light power control portion 30 is provided with: control circuits 33A and 33B acting as an optical power control portion for generating control signals based on monitoring signals sent from the power monitors 32A and 32B; and optical power regulating portions 34A and 34B serving as an optical power regulating portion for regulating the optical power of drop lights in response to the control signals sent from the control circuits 33A and 33B.

Incidentally, the optical branching circuits, the power monitors and the optical power regulating portions, which are used in the aforesaid add-light power control portion 20 may be employed as the optical branching circuits 31A and 31B, the power monitors 32A and 32B and the optical power regulating portions 34A and 34B. Additionally, the placement of the optical power regulating portions 34A and 34B is not limited to the herein-above described placement thereof. Each of these portions may be placed between, for instance, the drop-light output port of each of the OADM circuits 10A and 10B and each of the optical branching circuits 21A and 21B respectively provided in the add-light power control portions 20A and 20B.

In such an optical multiplexing/demultiplexing apparatus 1", respective drop lights output from the add-light power control portions 20A and 20B are led to the drop-light power control portion 30. Then, in the drop-light power control portion 30, the optical power of each drop lights is measured by the power monitors 32A and 32B. Subsequently, monitoring signals are sent from the power monitors 32A and 32B to the control circuits 33A and 33B, respectively. Then, in the control circuits 33A and 33B, the difference in the optical power between the drop lights is obtained by communicating with each other and by comparing the monitoring signals sent thereto respectively, with each other. Further, a control signal for correcting the obtained power difference is sent from each of the control circuits 33A and 33B to the optical power regulating portions 34A and 34B. Then, an operation of each of the optical power regulating portions 34A and 34B is controlled in response to this control signal so that the relative power of each of the drop lights at an output port of an optical multiplexer 40 is constant at all times. The respective drop lights, the optical power of each of which is controlled by the drop-light power control portion 30, are sent to the optical multiplexer 40 and then multiplexed. Incidentally, it is assumed that the wavelengths of the drop lights output from the optical multiplexing/demultiplexing portions 1A and 1B are different from one another. Then, the signal light multiplexed in the optical multiplexer 40 is led to one of the branch optical fiber pair paths.

Further, a signal light obtained by multiplexing two add lights which are different in wavelength from each other and are sent from the other of the branch optical fiber pair paths.

This multiplexed signal light is demultiplexed by an optical demultiplexer 41 corresponding to each wavelength. Thereafter, the demultiplexed signal lights are led to the add-light input ports of the add-light power control portions 20A and 20B.

Thus, the number of the branch optical fibers can be decreased by using the optical multiplexing/demultiplexing apparatus 1" in this way. Therefore, the use of one optical fiber pair paths in a branching system can be realized. Consequently, this optical multiplexing/demultiplexing apparatus 1" can be applied to the aforementioned WDM network system as illustrated in FIG. 10. Furthermore, the optical power of two kinds of drop light is controlled by the drop-light power control portion 30 to be constant. Thus, the power balance among the respective wavelengths of the WDM signal light propagating the branch system can be maintained at a constant level.

Next, for the optical multiplexing/demultiplexing apparatus 1" of FIG. 6, a modification that the optical power of each drop light is controlled by utilizing the value of the optical power thereof measured in the add-light power control portions 20A and 20B, will be described hereinbelow.

Figure 8:
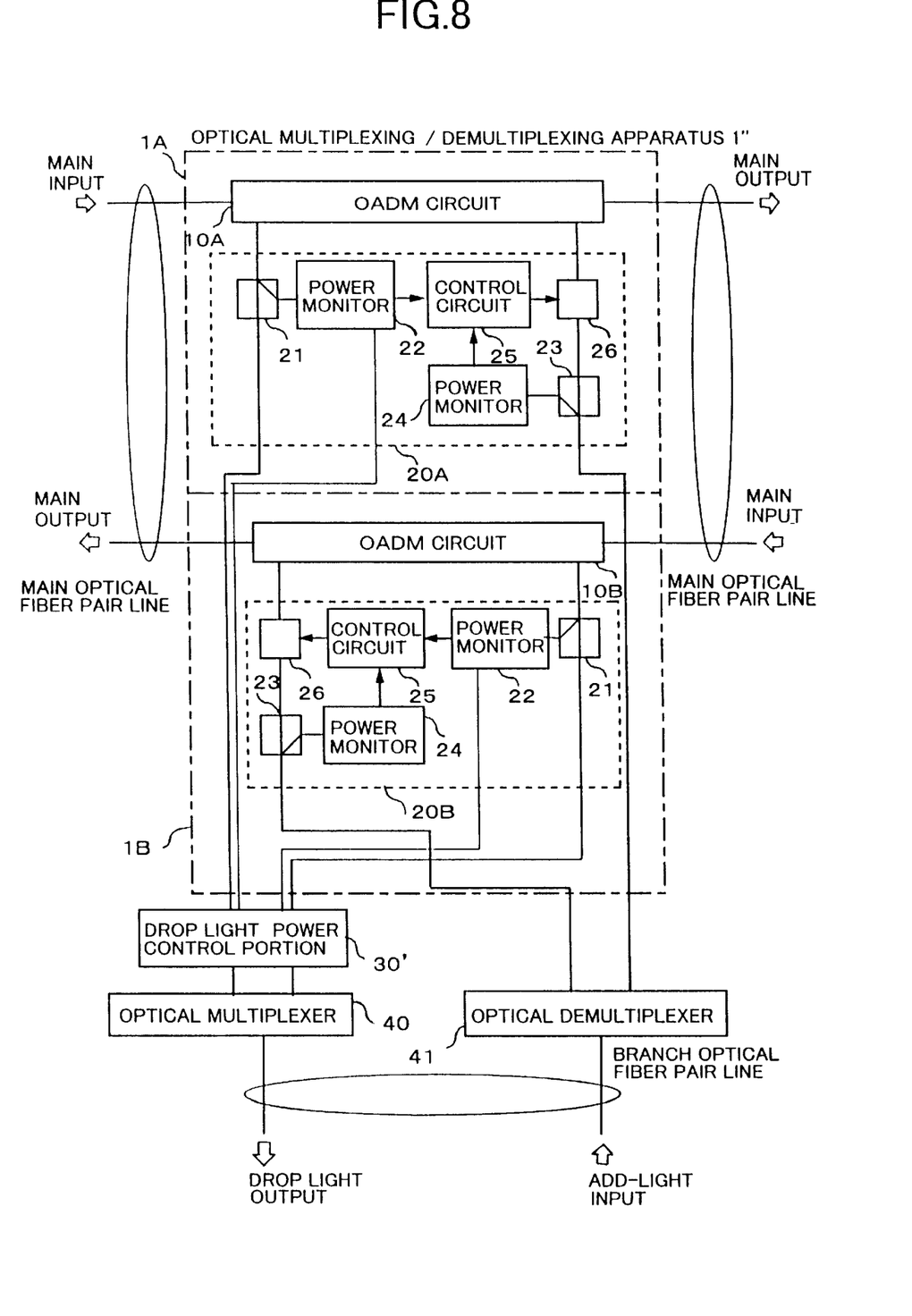
FIG. 8 is a block diagram showing a constitution example of the multiplexing/demultiplexing apparatus of FIG. 6 provided with a simplified drop-light power control portion.

FIG. 8 is a diagram showing the constitution of this modification of the multiplexing/demultiplexing apparatus in this case.

Figure 9:
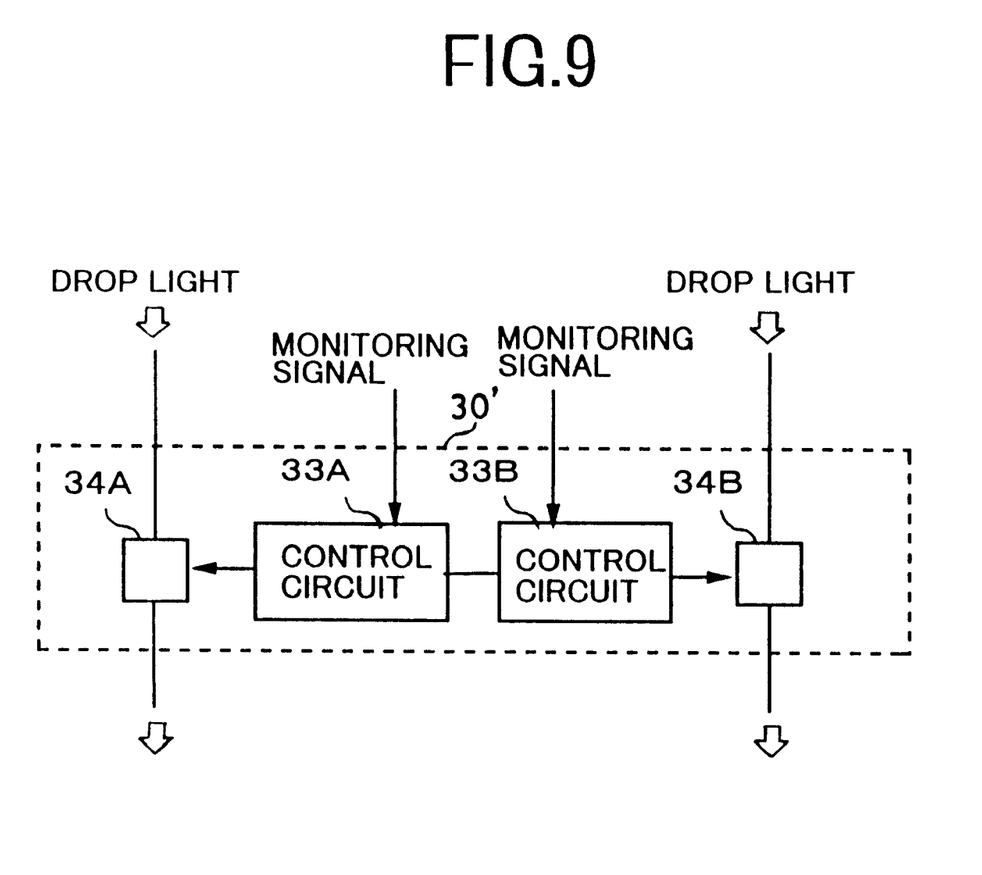
FIG. 9 is a block diagram showing a constitution example of a drop-light power control portion used in the optical multiplexing/demultiplexing apparatus of FIG. 8.

As is seen from FIG. 8, the constitution of this optical multiplexing/demultiplexing apparatus 1''' is different from the constitution of the optical multiplexing/demultiplexing apparatus 1" of FIG. 6 in that monitoring signals output from the power monitors 22A and 22B of the add-light power control portions 20A and 20B are input to a drop-light control portion 30'. As shown in FIG. 9, monitoring signals output from the power monitors 22A and 22B are input to the control circuits 33A and 33B, respectively. Thus, the drop-light power control portion 30' has a constitution in which the optical branching circuits 31A and 31B and the power monitors 32A and 32B as illustrated in FIG. 7 are omitted. The remaining constitution of the apparatus 1''' is similar to the constitution of the apparatus 1".

In such an optical multiplexing/demultiplexing apparatus 1''', the drop-light power control portion 30' controls the relative power of the two kinds of drop lights to be constant by referring to the values of the optical power of each drop light measured by the add-light power control portions 20A and 20B. Namely, each of the power monitors 22A and 22B of the add-light power control portions 20A and 20B serves as both of two power monitors for controlling the optical power of add light and for controlling the optical power of drop light. Consequently, the constitution of the drop-light power control portion can be simplified.

What is claimed is:

1. An optical multiplexing/demultiplexing apparatus comprising:
    a branching/inserting unit connected to a transmission path where a wavelength division multiplexed signal light is transmitted, and being capable of branching as a branch light, a signal light of at least one wavelength from a signal light transmitted on said transmission path and being capable of inserting as an insertion light, a signal light of at least one wavelength into the signal light transmitted on said transmission path; and
    an insertion-light power control unit to control an optical power of the insertion light based on an optical power of the branch light branched by said branching/inserting unit, so that the optical power of the insertion light inserted by said branching/inserting unit is substantially equal to the optical power of the branch light branched by said branching/inserting unit.

2. An optical multiplexing/demultiplexing apparatus according to claim 1, wherein
    said branching/inserting unit comprises:
        a signal light branching portion for sending a signal light of at least one wavelength included in a wavelength division multiplexed signal light traveling on said transmission path, to said insertion-light power control unit as a branch light and for outputting a signal light of the other wavelengths as a transmission light; and
        a signal light inserting portion for multiplexing the transmission light from said signal light branching portion, with the insertion light sent from said insertion-light power control unit to output a multiplexed signal to said transmission path, and
    said insertion-light power control unit comprises:
        a branch light power detecting portion for detecting the optical power of the branch light from said signal light branching portion;
        an insertion-light power detecting portion for detecting the optical power of the insertion light input from the exterior;
        an insertion-light power regulating portion for regulating the optical power of the insertion light; and
        a control portion for controlling an operation of said insertion-light power regulating portion, based on the optical power of the branch light detected by said branch light power detecting portion, and on the optical power of the insertion light detected by said insertion-light power detecting portion.

3. An optical multiplexing/demultiplexing apparatus according to claim 1, wherein a plurality of said branching/inserting units are provided corresponding to a plurality of main transmission paths, respectively, and
    wherein a plurality of said insertion-light power control units are provided corresponding to the plurality of main transmission paths, respectively.

4. An optical multiplexing/demultiplexing apparatus according to claim 3, which further comprises:
    a branch light power control unit to control said optical power of each of the branch lights respectively having wavelengths different from one another branched by said branching/inserting unit;
    a branch light multiplexing unit to multiplex branch lights output from said branch light power control unit and for outputting the multiplexed light to one of a pair of branch transmission paths; and
    an insertion light demultiplexing unit to demultiplex a signal light which is obtained by multiplexing each insertion light inserted by said branching/inserting unit and is sent from the other of the pair of branch transmission paths corresponding to wavelengths thereof and for outputting the demultiplexed light to said insertion-light power control unit,
    wherein the optical power of each branch light included in output signal light of said branch light multiplexing unit is controlled to be constant.

5. An optical multiplexing/demultiplexing apparatus according to claim 4, wherein said branch light power control unit comprises:
    an optical power detecting portion for detecting the optical power of each of the branch lights branched by said branching/inserting unit;
    an optical power regulating portion for regulating the optical power of each of the branch lights; and an optical power control portion for controlling an operation of said optical power regulating portion based on the optical power of each of the branch lights detected by said optical power detecting portion.

6. An optical multiplexing/demultiplexing apparatus according to claim 5, wherein said optical power control portion controls an operation of said optical power regulating portion based on the optical power of each of the branch lights detected by said optical power detecting portion of each insertion-light control device.

7. An optical multiplexing/demultiplexing method for enabling the branching of a branch signal light of at least one wavelength from a signal light traveling on a transmission path where a wavelength division multiplexed signal light is transmitted, and inserting of an insertion signal light of at least one wavelength into the signal light traveling on said transmission path, comprising:

determining the optical power of the branch signal light;

controlling an optical power of the insertion signal light based on the optical power of the branch signal light so that the optical power of the insertion signal light is substantially equal to the optical power of the branch light.

8. An optical multiplexing/demultiplexing apparatus comprising:

a branching/inserting unit connected to a transmission path where a wavelength division multiplexed signal light is transmitted, to branch as a branch light, a signal light of at least one wavelength from a signal light transmitted on said transmission path and to insert as an insertion light, a signal light of at least one wavelength into the signal light transmitted on said transmission path, the branching/inserting unit having input and output ports with transmission light passing through the input and output ports; and an insertion-light power control unit to control an optical power of the insertion light based on an optical power of the branch light, so that the power of the insertion light is substantially equal to the power of the branch light.

* * * * *